(12) United States Patent
Joy (10) Patent No.: US 9,376,232 B2
(45) Date of Patent: *Jun. 28, 2016

(54) FOOD CONTAINER (71) Applicant: Lifefactory, Inc., Sausalito, CA (US)

(72) Inventor: Daren Edward Joy, Sausalito, CA (US)

(73) Assignee: Lifefactory, Inc., Sausalito, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,195

(22) Filed: May 9, 2015

(65) Prior Publication Data

US 2015/0239606 A1 Aug. 27, 2015

Related U.S. Application Data

(63) Continuation of application No. 14/308,569, filed on Jun. 18, 2014, now Pat. No. 9,038,843, which is a continuation-in-part of application No. 14/278,560, filed on May 15, 2014, now Pat. No. 9,067,713, which (Continued)

(51) Int. Cl.
*B65D 13/02* (2006.01)
*B65D 45/00* (2006.01)
(Continued)

(52) U.S. Cl.
CPC ............... *B65D 13/02* (2013.01); *A47J 36/00* (2013.01); *A47J 36/027* (2013.01); *A47J 36/06* (2013.01);
(Continued)

(58) Field of Classification Search
CPC ........ B65D 45/16; B65D 45/18; B65D 45/20; B65D 45/22; B65D 45/24; B65D 45/28; B65D 45/30; B65D 45/00; B65D 45/02; B65D 45/04; B65D 43/02; B65D 43/06; B65D 25/34; B65D 13/00; B65D 13/02; A47J 47/14; A47J 47/00; A47J 47/02; A47J 36/00; A47J 36/06; A47J 36/027; A47J 36/10
USPC ........ 220/4.21, 784, 788, 315, 322, 323, 324, 220/326, 23.87, 23.89, 23.91, 23.83, 574.3, 220/4.26, 4.27, 62.12, 737, 739, 740; 215/11.3, 11.1, 12.2; D7/507
See application file for complete search history.

(56) References Cited

U.S. PATENT DOCUMENTS 3,360,153 A * 12/1967 Wheaton, Jr. ........... A47J 36/06
                                                              220/256.1
3,374,298 A    3/1968 Studen
(Continued)

FOREIGN PATENT DOCUMENTS

WO    2009032951 A1    3/2009
WO    2010150985 A2   12/2010
WO    2011132858 A2   10/2011

OTHER PUBLICATIONS

International Search Report and Written Opinion dated May 12, 2014 for PCT Patent Application No. PCT/US2014/015900.
(Continued)

*Primary Examiner* — Steven A. Reynolds
*Assistant Examiner* — Javier A Pagan
(74) *Attorney, Agent, or Firm* — The Mueller Law Office, P.C.

(57) ABSTRACT

A food container includes a glass container, a lid and a protective sleeve. The sleeve covers at least a portion of the side walls and bottom surface of the glass container. The lid has a perimeter that is absent of features directly securing the lid to the container. The lid has a receiving feature which is engaged by a latch on the protective sleeve when the latch is moved from an open position to a locked position.

11 Claims, 7 Drawing Sheets

Related U.S. Application Data is a continuation of application No. 13/902,660, filed on May 24, 2013, now Pat. No. 8,746,487.

(60) Provisional application No. 61/773,129, filed on Mar. 5, 2013.

(51) Int. Cl.

| | |
|---|---|
| *B65D 45/16* | (2006.01) |
| *A47J 36/00* | (2006.01) |
| *A47J 36/02* | (2006.01) |
| *A47J 36/06* | (2006.01) |
| *A47J 47/00* | (2006.01) |
| *A47J 47/02* | (2006.01) |
| *A47J 47/14* | (2006.01) |
| *B65D 25/34* | (2006.01) |
| *B65D 43/02* | (2006.01) |
| *B65D 85/00* | (2006.01) |

(52) U.S. Cl.
CPC ............ *A47J 47/00* (2013.01); *A47J 47/02* (2013.01); *A47J 47/14* (2013.01); *B65D 25/34* (2013.01); *B65D 43/02* (2013.01); *B65D 45/00* (2013.01); *B65D 45/16* (2013.01); *B65D 85/70* (2013.01); *B65D 2543/00305* (2013.01)

(56) References Cited

U.S. PATENT DOCUMENTS

| | | | | |
|---|---|---|---|---|
| D212,704 S | * | 11/1968 | Benes | D7/360 |
| 3,769,899 A | * | 11/1973 | Kostko | A47J 39/00 |
| | | | | 99/324 |
| 4,116,352 A | * | 9/1978 | Davis | B65D 53/02 |
| | | | | 215/270 |
| 4,457,447 A | * | 7/1984 | Kirkis | B65D 43/0212 |
| | | | | 220/784 |
| 4,512,497 A | * | 4/1985 | Grusin | A47J 36/06 |
| | | | | 126/389.1 |
| 4,700,842 A | | 10/1987 | Grusin | |
| 5,048,707 A | * | 9/1991 | Hallberg | A21B 3/133 |
| | | | | 220/324 |
| 5,266,763 A | * | 11/1993 | Colombo | B65D 25/18 |
| | | | | 219/734 |
| 5,507,385 A | * | 4/1996 | Koloski | B25H 3/023 |
| | | | | 206/372 |
| D447,006 S | * | 8/2001 | Thun | D7/538 |
| 6,305,546 B1 | | 10/2001 | Saunders et al. | |
| 6,325,239 B2 | * | 12/2001 | Randall | 220/315 |
| 6,649,891 B1 | | 11/2003 | Kitko et al. | |
| 6,666,348 B2 | * | 12/2003 | Fore | B65D 1/26 |
| | | | | 220/315 |
| 7,063,231 B2 | | 6/2006 | Stanos et al. | |
| 7,090,089 B2 | * | 8/2006 | Lown | B65D 43/0218 |
| | | | | 220/324 |
| 7,140,506 B1 | * | 11/2006 | Brady | A47J 36/10 |
| | | | | 126/373.1 |
| D544,307 S | * | 6/2007 | Ablo | D7/538 |
| D585,558 S | * | 1/2009 | Feeley | D24/199 |
| 7,624,891 B2 | * | 12/2009 | Appelbaum | B65D 45/20 |
| | | | | 220/326 |
| 7,654,411 B2 | | 2/2010 | Boots et al. | |
| D618,065 S | * | 6/2010 | Joy | D7/607 |
| D629,259 S | * | 12/2010 | Joy | D7/607 |
| 7,854,344 B2 | * | 12/2010 | Suk | B65D 43/0212 |
| | | | | 220/318 |
| 8,100,285 B2 | * | 1/2012 | Aseff | A47G 19/02 |
| | | | | 220/573.1 |
| 8,746,487 B1 | * | 6/2014 | Joy | B65D 45/00 |
| | | | | 220/232 |
| 8,827,101 B2 | * | 9/2014 | Ye | A47J 36/10 |
| | | | | 220/212.5 |
| 2005/0035119 A1 | | 2/2005 | Hull et al. | |
| 2005/0035125 A1 | * | 2/2005 | Bae | B65D 43/0218 |
| | | | | 220/326 |
| 2005/0139604 A1 | | 6/2005 | Kim | |
| 2006/0249522 A1 | * | 11/2006 | Ringo | B65D 25/22 |
| | | | | 220/784 |
| 2006/0266757 A1 | | 11/2006 | Camacho et al. | |
| 2008/0041850 A1 | * | 2/2008 | Tucker | B65D 21/0219 |
| | | | | 220/212 |
| 2008/0190951 A1 | * | 8/2008 | Gallagher | B65D 21/0233 |
| | | | | 220/826 |
| 2009/0057257 A1 | * | 3/2009 | Marcus | A61J 9/08 |
| | | | | 215/11.6 |
| 2009/0107996 A1 | * | 4/2009 | LeBoeuf | A47J 36/04 |
| | | | | 220/200 |
| 2009/0223853 A1 | | 9/2009 | Kim | |
| 2010/0224585 A1 | * | 9/2010 | Feeley | A61J 9/06 |
| | | | | 215/11.1 |
| 2011/0114526 A1 | | 5/2011 | Neumann et al. | |
| 2011/0139777 A1 | * | 6/2011 | Sosnovsky | B25H 3/021 |
| | | | | 220/23.83 |
| 2011/0259777 A1 | | 10/2011 | Gupta et al. | |
| 2013/0020317 A1 | * | 1/2013 | Martin | A61J 9/06 |
| | | | | 220/23.91 |
| 2013/0206771 A1 | * | 8/2013 | Arnold | A47J 36/10 |
| | | | | 220/315 |
| 2014/0252000 A1 | | 9/2014 | Joy | |
| 2014/0299603 A1 | | 10/2014 | Joy | |

OTHER PUBLICATIONS

Notice of Allowance and Fees dated Feb. 3, 2015 for U.S. Appl. No. 14/308,569.
Notice of Allowance and Fees dated Mar. 2, 2015 for U.S. Appl. No. 14/278,540.
Office Action dated Nov. 3, 2014 for U.S. Appl. No. 14/278,560.
Office Action dated Nov. 3, 2014 for U.S. Appl. No. 14/308,569.

* cited by examiner

FOOD CONTAINER

RELATED APPLICATIONS

This application is a continuation of U.S. patent application Ser. No. 14/308,569, filed on Jun. 18, 2014 and entitled "Food Container"; which is a continuation-in-part of U.S. patent application Ser. No. 14/278,560, filed on May 15, 2014 and entitled "Food Container"; which is a continuation of U.S. patent application Ser. No. 13/902,660, issued on Jun. 10, 2014 as U.S. Pat. No. 8,746,487, and entitled "Food Container"; which claims priority to U.S. Provisional Patent Application No. 61/773,129, filed Mar. 5, 2013 and entitled "Food Container"; all of which are hereby incorporated by reference for all purposes.

BACKGROUND

Food containers are used for many purposes, such as for storing food in a refrigerator or freezer, cooking in a microwave or oven, serving, and transporting food items. Thus, food containers must be able to withstand various environments while also being durable enough for daily use. Plastic materials are often used for food containers because of their low-cost and lightweight characteristics. However, many plastic materials can leach unsafe chemicals into food, particularly when exposed to heat such as in cooking or being placed in a dishwasher. Thus, there is a continued need to provide durable and safe food containers.

SUMMARY

A food container includes a glass container, a lid and a protective sleeve. The sleeve covers at least a portion of the side walls and bottom surface of the glass container. The lid has a perimeter that is absent of features directly securing the lid to the container. The lid has a receiving feature which is engaged by a latch on the protective sleeve when the latch is moved from an open position to a locked position.

DETAILED DESCRIPTION

With growing awareness around the dangers of plastic, consumers are seeking out safer materials to store items that they ingest such as food and drink. One such safer material is glass; however, glass can be prone to breaking when dropped. Consequently, glass is a strong material around the house but has limited effectiveness when being moved to different locations. In this disclosure, a food container is described that enables consumers to use glass food storage products on the go by providing a protective layer to prevent breakage. The protective layer is a sleeve that surrounds the outer surface of a glass article, such as described in U.S. Patent Publication No. 2009/0057257, published Mar. 5, 2009, which is hereby incorporated by reference. The container also has a lid to cover the top of the container, where latches on the sleeve are able to secure the lid by engaging receiving features on either side of the lid. This provides a secure closure to prevent leaking. The lid may be designed with an O-ring to provide an additional seal around the inside of the glass.

Figure 1:
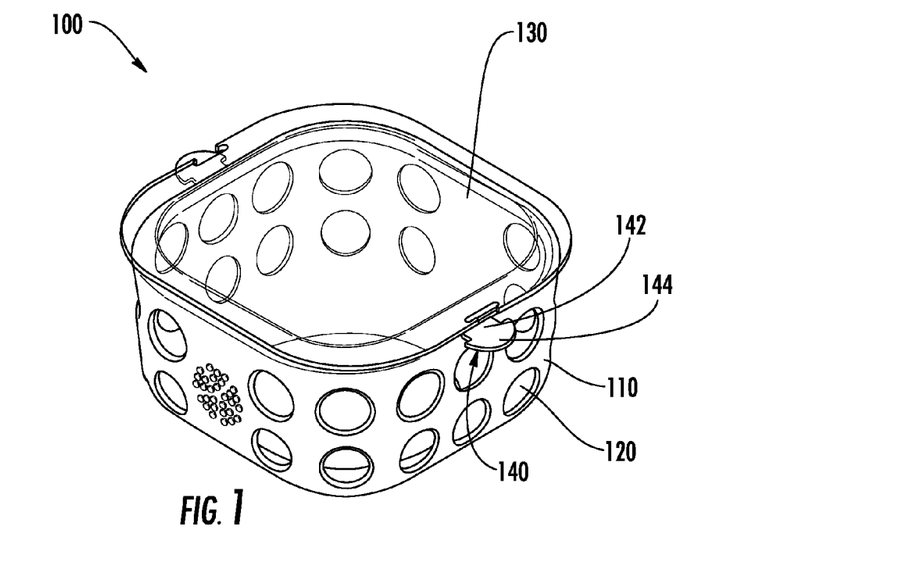
FIG. 1 is a perspective view of an embodiment of a food container.
Figure 2:
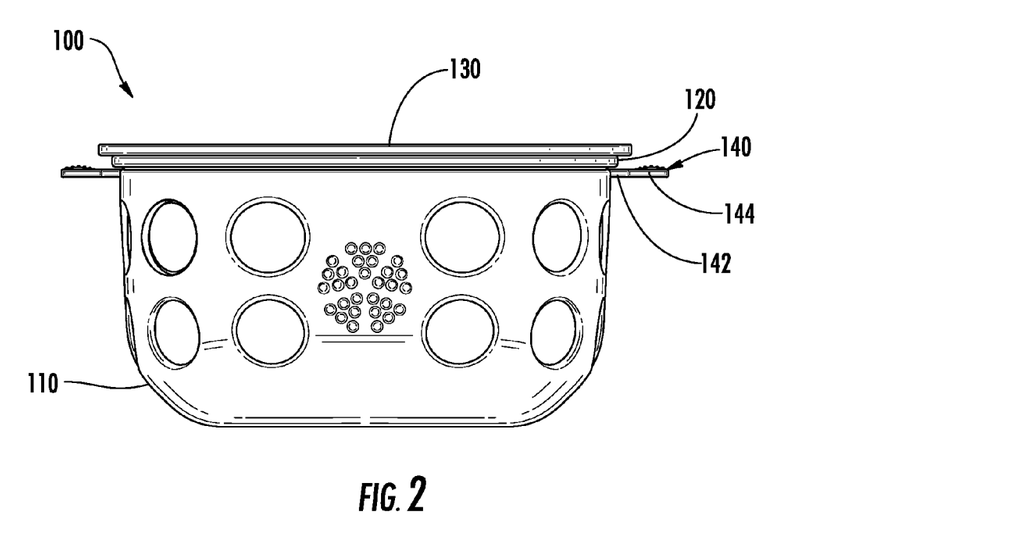
FIG. 2 is a side view of the container of FIG. 1.

FIGS. 1 and 2 show perspective and side views, respectively, of a food container 100 in one embodiment. The food container 100 includes a protective outer sleeve 110 surrounding a glass container 120, and a lid 130 covering a top opening of container 120. The sleeve 110 covers some or all of the side walls, and some or all of the bottom surface of glass container 120. The sleeve 110 includes latches 140 that can be moved from an open, uncoupled position to a locked position. In the embodiment of FIGS. 1 and 2, latch 140 is bent upward to secure the lid 130, preventing leakage from container 120. Incorporation of a securing mechanism into sleeve 110, instead of lid 130, enables the use of a wider range of materials for lid 130, while the sleeve 110 may be fabricated from other materials suitable for its function as a protective sleeve. For example, sleeve 110 may have flexible, stretchable, heat-resistant or other characteristics that are different from lid 130. Thus, the design of container 100 as shall be described herein enables a glass container to be secured and sealed with a lid, using safe, durable plastics and other materials. In some embodiments the lid may be made of plastic, glass, or other materials.

Sleeve 110 may be made of, for example, silicone, and is designed to fit snugly on the outer surface of container 120. That is, the sleeve fits tightly enough such that some amount of force must purposely be applied to remove sleeve 110 from container 120. For example, a user may be required to peel or stretch the sleeve 110 off of container 120 in order to remove it. A user may be required to apply an intentional force to separate sleeve 110 from container 120, rather than, for example, container 120 being easily lifted out of sleeve 110. In some embodiments, sleeve 110 and container 120 may have an interference fit. In other embodiments, sleeve 110 and container 120 may have a sliding fit, but with close enough sizing that the surface friction of sleeve 110 requires a user to apply force to insert or remove container 120. In further embodiments, the container 120 may have a draft angle along its side walls and the sleeve 110 may have a matching draft angle. In yet other embodiments, container 120 may have a draft angle along its side walls while sleeve 110 has vertical side walls with no draft angle, to assist in achieving a tight fit on the container 120.

The sleeve 110, container 120 and lid 130 may be provided as a system, with the sleeve 110 being pre-mounted on the container 120. However, the sleeve 110 may also be removed from container 120 if desired, and placed back on container 120 by stretching the sleeve 110 and sliding it back onto container 120. The snug fit of sleeve 110 around container 120 helps to ensure that the sleeve 110 will remain on container 120 to protect it at all times, even when being transported, washed, or otherwise manipulated.

Using glass as the material that will contact food provides advantages over other materials. For example, plastic containers are more resilient than glass in terms of breakage, but can contain potentially harmful chemicals. Stainless steel containers may be potentially coated with harmful materials and are likely to add a metallic taste to food or drink. Protective carrying bags or cases for glass containers are known in the art, but these protective items are not designed as part of the container product and thus can be lost or misplaced or can easily slip off the container, leaving the container unprotected. These protective items are also often used to provide insulative properties and are made of materials that must be cleaned separately from the glass container. In the food container 100 described herein, the sleeve 110 and container 120 are designed as a unit, so that they can remain together during the various phases of use. The sleeve 110 and glass container 120 are dishwasher safe, oven safe, freezer safe and microwave safe, without having to remove the protective sleeve.

Figure 3:
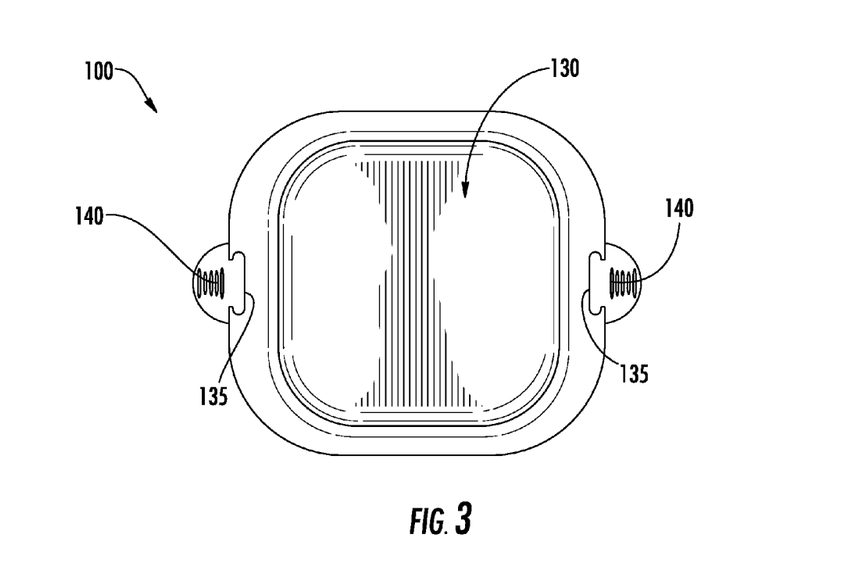
FIG. 3 shows a top view of the food container of FIG. 1.

FIG. 3 illustrates a top view of the container 100, in which the lid 130 and latches 140 are shown. Latches 140 are coupled to the sleeve 110, near the upper rim of sleeve 110. In some embodiments, latches 140 are integrally formed with the sleeve 110, extending approximately perpendicularly to the surface of sleeve 110. In such embodiments, the latches pivot by being pulled upward and stretched to engage lid 130. In FIG. 3 the latches 140 are shown in an open position, uncoupled to lid 130. The lid 130 has receiving features, configured as slots 135 in this embodiment, to engage latches 140 when the latches 140 are pivoted upward. For example, latches 140 may snap into slots 135.

Latches 140 may have a neck portion 142 (FIGS. 1-2) that fits into slots 135, and an outer tab portion 144. The outer tab portion 144 may be configured to have a large enough surface area to prevent the latch 140 from slipping out of slot 135 and to facilitate a user grasping onto it. The slots 135 are configured here to be linear, to receive the latches 140 which are configured as flat tabs. However, in other embodiments, other shapes for latches 140 and slots 135 are possible. For example, latches 140 may be configured as a C-shaped handle to assist a user in carrying the container 100 in addition to serving as a locking element. In such an embodiment, the lid 130 may have two receiving elements rather than a single slot on its edge, to receive the two ends of the handle-shaped latch. The slots could be circular, square, or a cutout of another shape according to the cross-sectional shape of the handle.

Latches 140 in the embodiment of FIG. 3 are located near an upper rim of sleeve 110 so that they are close in proximity to lid 130. In other embodiments, latches 140 may be away from the upper rim of the sleeve, such as mid-way along the side wall of sleeve 110 or extending from the bottom surface of the sleeve. In yet other embodiments, latches 140 need not pivot upward but may, for example, be moved by pulling or stretching it upward to be inserted into the receiving feature of the lid. For instance, a latch may be configured as a rod extending vertically from the side wall or from the upper edge of the sleeve. The rod may have a ball or tab at its end that the user may grasp onto extend the rod upward to place it into a receiving groove in the lid.

Figure 4:
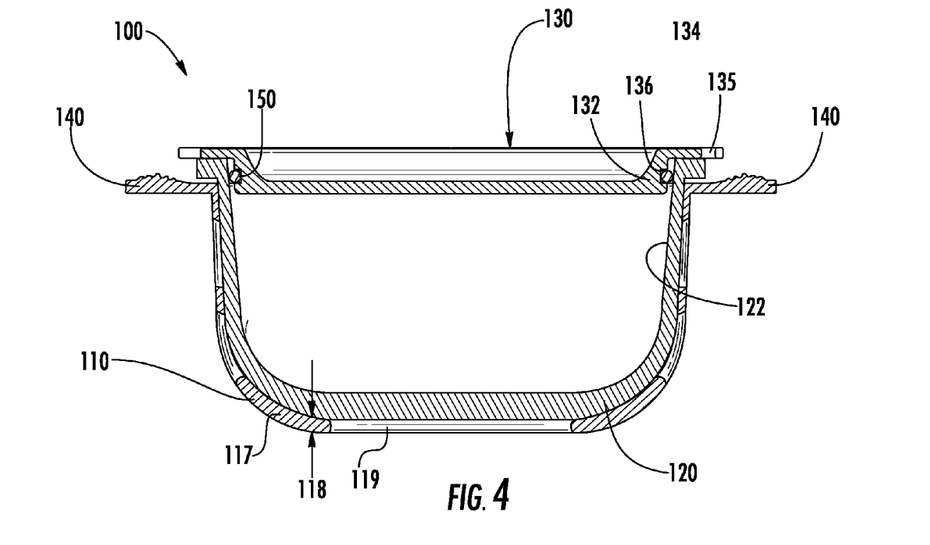
FIG. 4 provides a vertical cross-sectional view of the food container of FIG. 1, with latches unlocked.

FIG. 4 is a vertical cross-sectional view of the container 100, showing glass container 120 with sleeve 110 on its outer surface, and lid 130 covering glass container 120. Lid 130 has a depressed center that forms a lip 132 on its underside, where the lip 132 contacts the interior wall 122 of container 120. By lid 130 contacting the interior wall 122 of container 120, the contents inside container 120 are securely prevented from leakage. The indented center of lid 130 also keeps the contents away from the upper opening of the container 120, which can also help to prevent leakage. A sealing element such as a gasket or O-ring 150 may be included with lid 130, to provide further sealing between lid 130 and container 120. In this embodiment, O-ring 150 is seated within a groove 136 in lip 132. O-ring 150 may be made of, for instance, an elastomer, silicone, rubber or other suitable materials designed to withstand the same temperatures and conditions as lid 130, glass container 120 and sleeve 110. In various embodiments, the O-ring 150 may be other types of sealing elements including, but not limited to, a hollow O-ring, hollow D-ring, wiper blade seal, overmolded silicone or perimeter seal.

In this embodiment, latch 140 is formed integrally with and of the same material as sleeve 110, where sleeve 110 is a pliable material such as silicone. The pliability of the material allows sleeve 110 to be snugly fit onto container 120, and also allows latch 140 to pivot with respect to sleeve 110. In other embodiments, latch 140 may be a separate component that is pivotally coupled to sleeve 110, where sleeve 110 is still made of the pliable material and latch 140 may be, for example, a different material hingedly coupled to sleeve 110.

Because lid 130 is used primarily as a cover and not as a securing mechanism onto glass container 120, the material for lid 130 is not required to have a flexibility to enable it to snap onto the container 120. For example, the perimeter 134 of lid 130 may have a bottom surface that lies in a substantially planar fashion over the opening of glass container 120 without needing a U-shaped lip, as in conventional container lids, to secure it over the edge of glass container 120. Lid 130 may be made of a relatively hard plastic such as polypropylene or nylon, which are materials that are free of, for example, phthalates or bisphenol-A. In other embodiments, the lid may be made of glass. Plastic food container lids known in the art typically require softer materials that are flexible enough to snap directly onto the container, which allows the ability for the lid to seal to a container but results in flimsy and less safe materials. In contrast, by incorporating the latches 140 into sleeve 110, the lid 130 does not need to flex and conform over the edge at the opening of glass container 120. That is, lid 130 does not provide the securing mechanism to container 120. Instead, sleeve 110 is used to provide the mechanism to secure lid 130 onto container 120. Thus, lid 130 may be a higher durometer material than the durometer of sleeve 110. Harder durometer plastics can be used for lid 130, making lid 130 durable against, for example, breakage from mechanical stresses or deformation from thermal stresses. The sleeve 110 may be of the same or different material as lid 130, chosen for its desired properties as a protective sleeve. The ability of the lid 130 to be made of a stiffer material, absent of a pre-formed securing mechanism, may be further assisted by the use of a sealing element such as O-ring 150.

In some embodiments, lid 130 may be fabricated from food-safe materials, where the O-ring 150 provides a seal with the interior of the container 120 to prevent leakage. Materials for lid 130 include polymers such as polypropylene, nylon, high-density polyethylene and low-density polyethylene; metals such as stainless steel, anodized aluminum and enameled steel; silicone; glass; bio-plastics; wood, such as bamboo; and ceramic. Materials for sleeve 110 include silicone, thermoplastic elastomers (e.g., Santoprene®), polychloroprene (e.g., Neoprene), felt (natural or man-made), leather, latex rubber, heat-resistant fabrics, and polyester films capable of serving as a heat shield (e.g., Mylar®).

Figure 5:
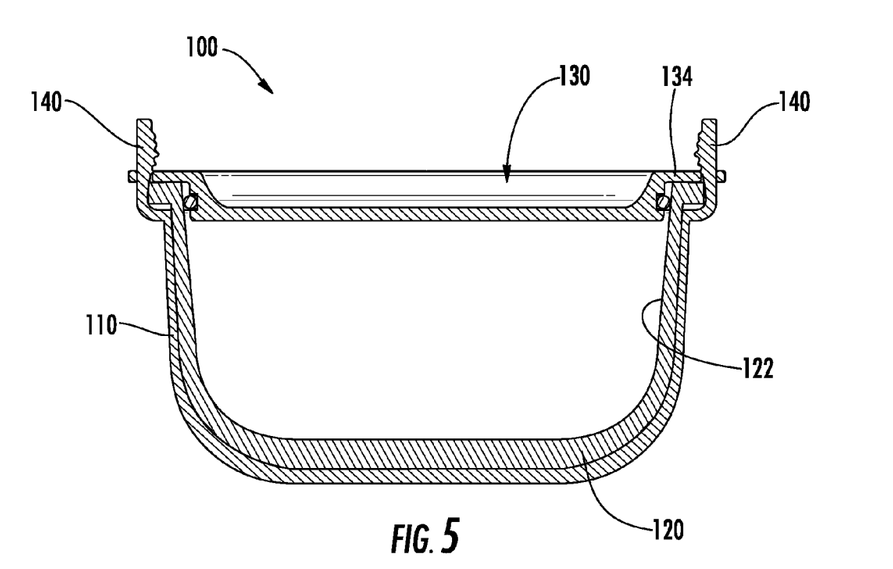
FIG. 5 provides a vertical cross-sectional view of the food container of FIG. 1, with latches in a locked position.
Figure 6:
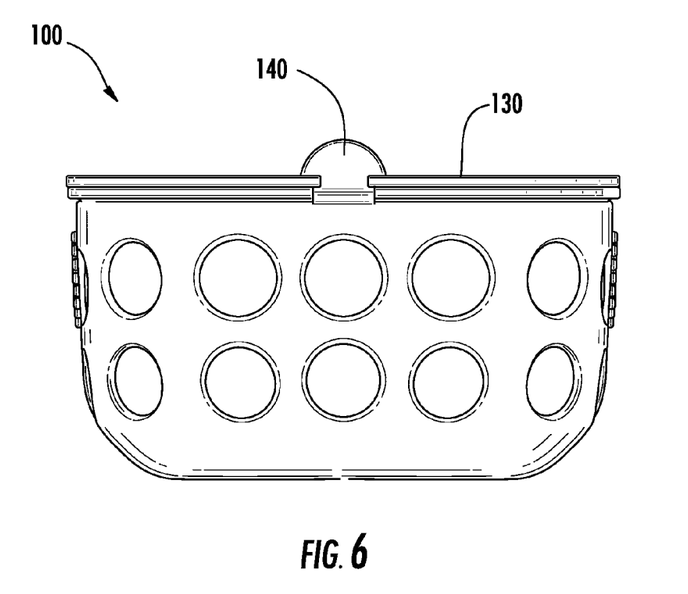
FIG. 6 is a side view of the container of FIG. 5.

FIG. 5 shows a cross-sectional view of container 100 with latches 140 in their locked position, where the latches 140 are pivoted upward to engage with lid 130. FIG. 6 shows a side view of FIG. 5, with the latches 140 in their locked position. As can be seen, the seating of latches 140 in slots 135 provides the mechanism to hold lid 130 onto container 120, whereas the planar perimeter 134 (FIG. 5) of lid 130 simply rests on top of container 120. That is, the latches 140 of sleeve 110 provide the locking between lid 130 and container 120, rather than features of the lid 130 itself being used to secure to glass container 120.

Returning to FIG. 4, in some embodiments, a bottom surface 117 of the sleeve 110 may have sufficient thickness to provide additional protective thermal and/or mechanical properties to the glass container 120. For example, a thickness 118 of the bottom surface 117 may enable the sleeve to act as a trivet, such as when taking the container 100 out of an oven and placing it on another surface. In some embodiments, the thickness 118 of the bottom surface 117 is greater than the remainder of the sleeve 110. In an exemplary embodiment, the sleeve 110 may be silicone with a thickness 118 ranging from, for example, 1 mm to 7 mm. In some embodiments, the bottom surface 117 may include an area of ridges or a hollow void to enhance the insulation properties. In another embodiment, the bottom surface 117 may include a secondary material (not shown) embedded within the bottom surface 117, to add insulating properties or draw heat away from the surface on which the container 100 is placed. The secondary material may be, for example, wood, insulating microspheres, wool felt, or a metal. Note that in some embodiments, the sleeve 110 may include an opening 119 in the bottom surface 117, while in other embodiments the bottom surface of the sleeve 110 may be solid, with no opening present in (e.g., FIG. 5).

Figure 7:
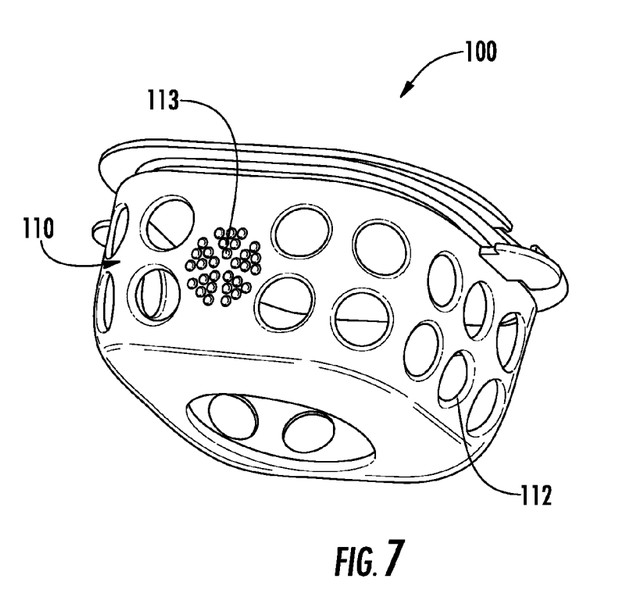
FIG. 7 provides a perspective view of the food container of FIG. 1.
Figure 8:
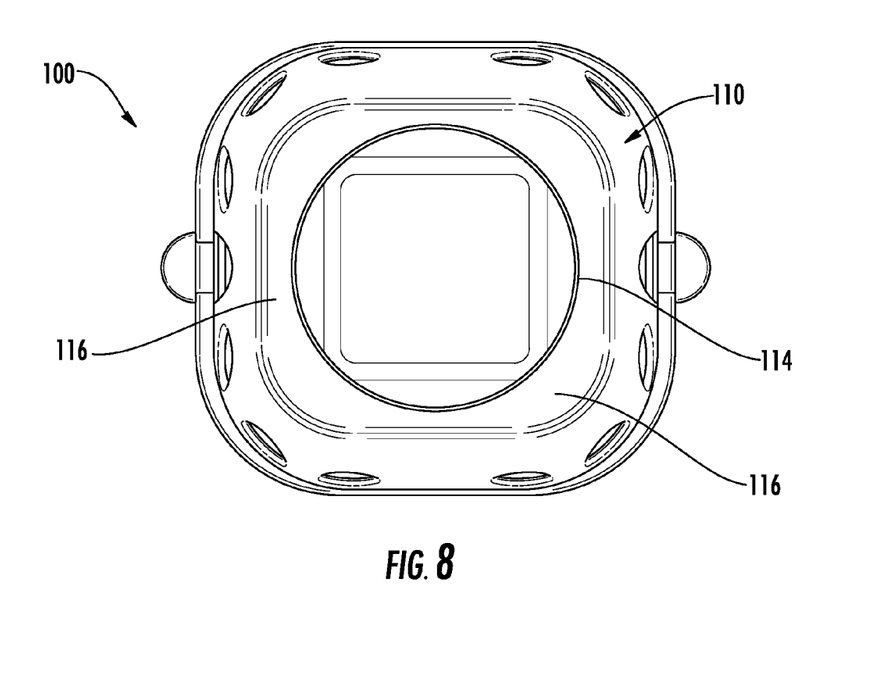
FIG. 8 is a bottom view of an embodiment of the food container of FIG. 1.

FIG. 7 shows an additional perspective view of container 100. Sleeve 110 may be designed with one or more openings 112 that are through-holes. These openings 112 allow a user to see the contents within the container 120, and also enable water drainage between the sleeve 110 and container 120 during washing. Thus, the openings 112 enable the sleeve 110 to remain on the container 120 during all stages, from food preparation, through cooking, and washing. The openings 112 allow the use of an opaque material for sleeve 110, such as silicone, while still allowing visual access when sleeve 110 is on container 120. Visual access allows a user to ascertain the contents inside the food container, and to assess cleanliness of the container while washing. FIG. 8 is a bottom view of the container 100, showing that the bottom surface of sleeve 110 has a large opening 114 in this embodiment, to further facilitate drainage of water during washing and to enable visual access. Sleeve 110 still covers a portion 116 of the bottom of glass container 120, such as the periphery in FIG. 9, to provide protection for the glass. Covering at least a portion of the bottom surface of the glass container 120 also enables sleeve 110 to serve as a trivet, such as when container 120 is being used to serve hot food.

Although sleeve 110 has side walls that are patterned with an array circular holes in these embodiments, other shapes and patterns of openings are possible. Furthermore, the quantity and sizes of openings may vary. Other features may also be molded on the outer surface of sleeve 110 to enhance the ability of a user to grip the surface. In the embodiments of the present disclosure, exemplary raised bumps 113 are incorporated onto the sleeve 110 to provide a gripping area. Text or images may also be incorporated into the sleeve, such as to illustrate instructions for the user, or logos.

Figure 9:
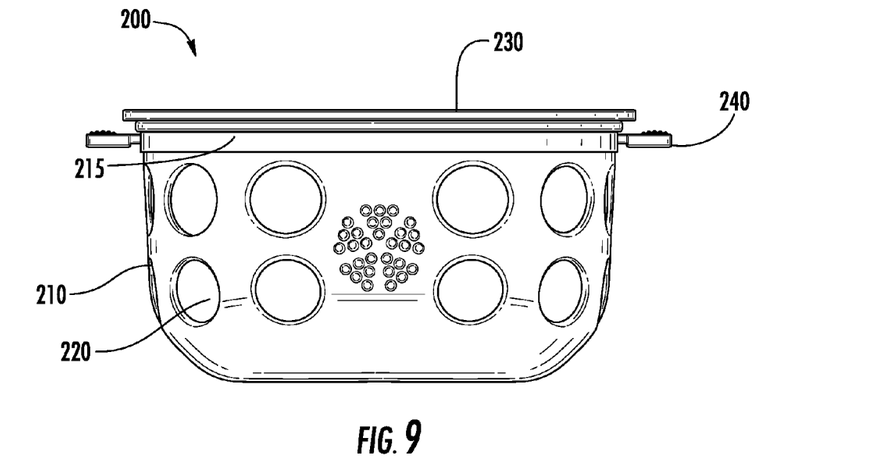
FIG. 9 shows a side view of another embodiment of a food container.

FIG. 9 provides a side view of another embodiment of a food container 200 in which sleeve 210 has a thicker band 215 at its upper edge, compared to the thickness of the remainder of sleeve 210. Band 215 provides increased tension, to deter sleeve 210 from sliding off container 220. Latches 240 also have increased thickness in this embodiment, compared to latches 140 of the previous figures. The increased thickness can provide higher durability and/or improved securing of lid 230 to container 220.

Figure 10:
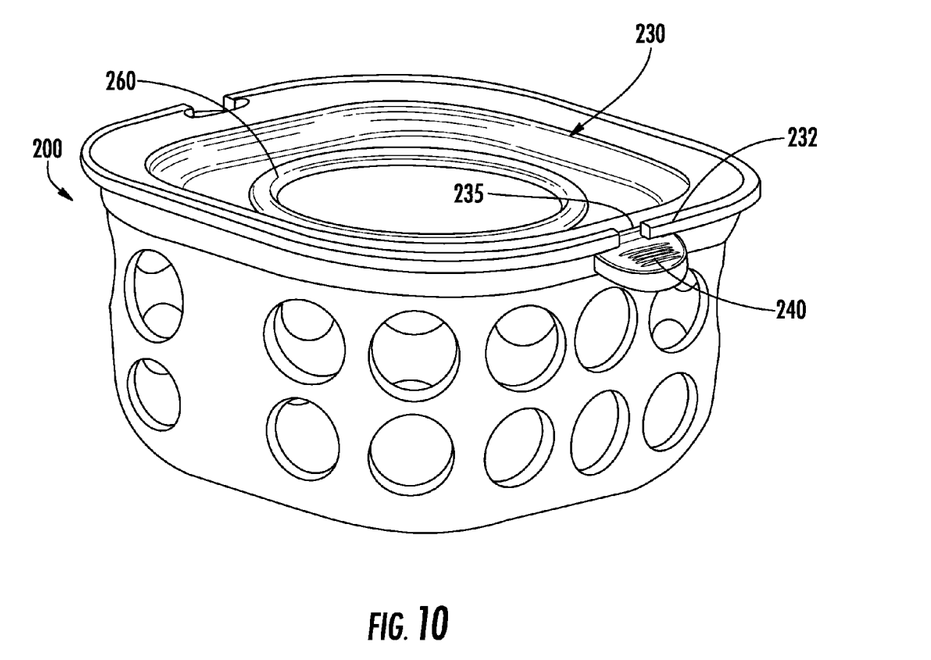
FIG. 10 is a top perspective view of the food container of FIG. 9.

FIG. 10 shows a top perspective view of the food container 200, showing additional features of the lid 230. In this embodiment, lid 230 has a raised edge 232 around a top surface of its perimeter. Raised edge 232 may assist in retaining latch 240 in slot 235 by providing an additional surface to catch latch 240. Raised edge 232 may be present around the entire perimeter of lid 230, or just a portion near the slot 235. Lid 230 also has a raised track 260 within its depressed central area that enables another food container 200 to be stacked on top of the lid 230. For example, track 260 may be a circular ring sized to fit into opening 114 of FIG. 8.

Figure 11:
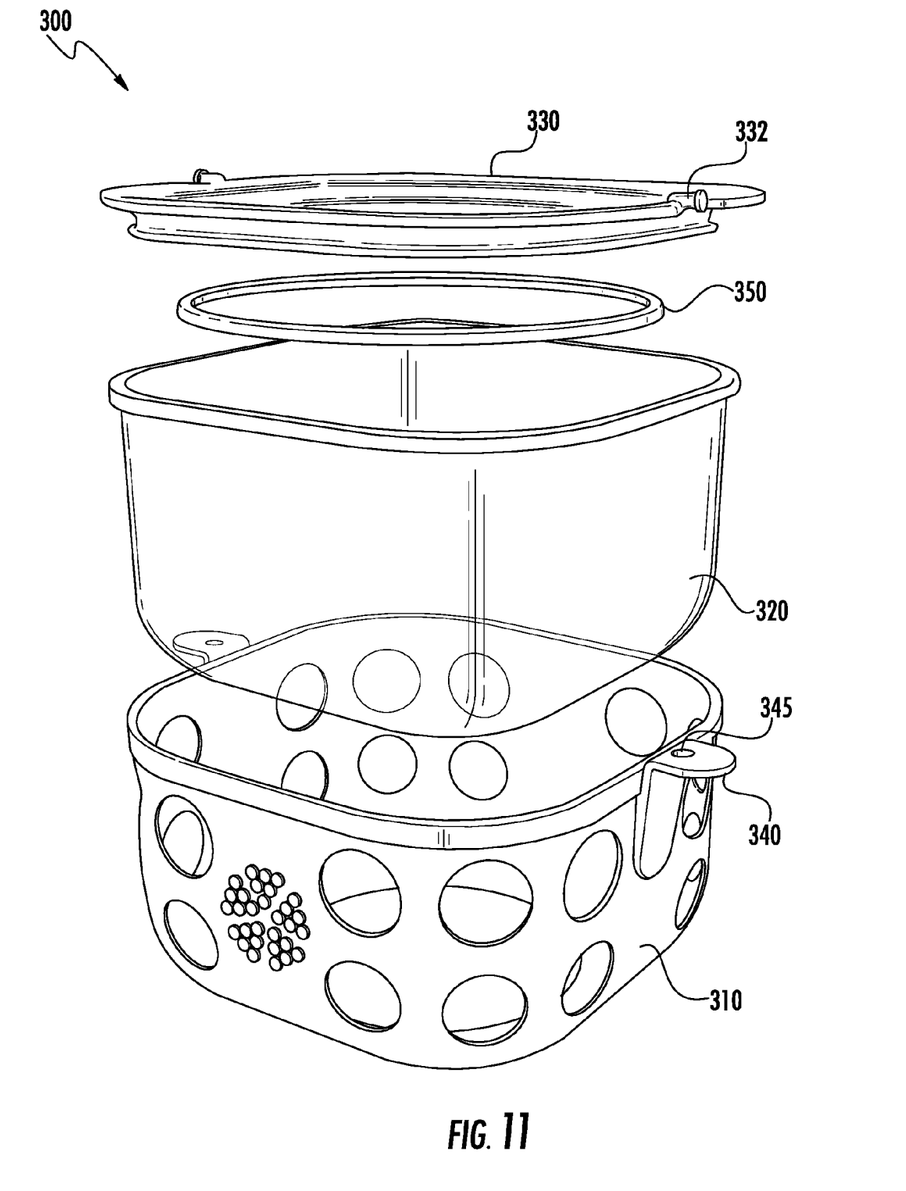
FIG. 11 is an exploded assembly view of a further embodiment of a food container.
Figure 12:
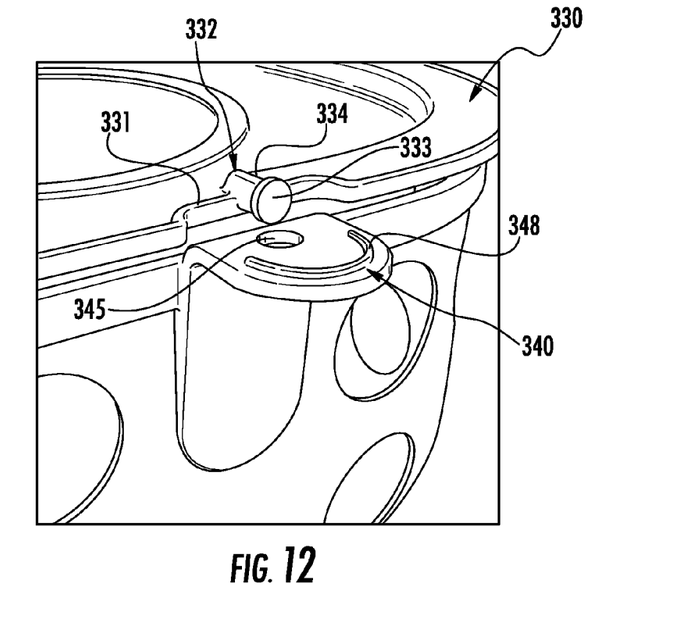
FIG. 12 is a detailed view of the latch of FIG. 11, in an open position.
Figure 13:
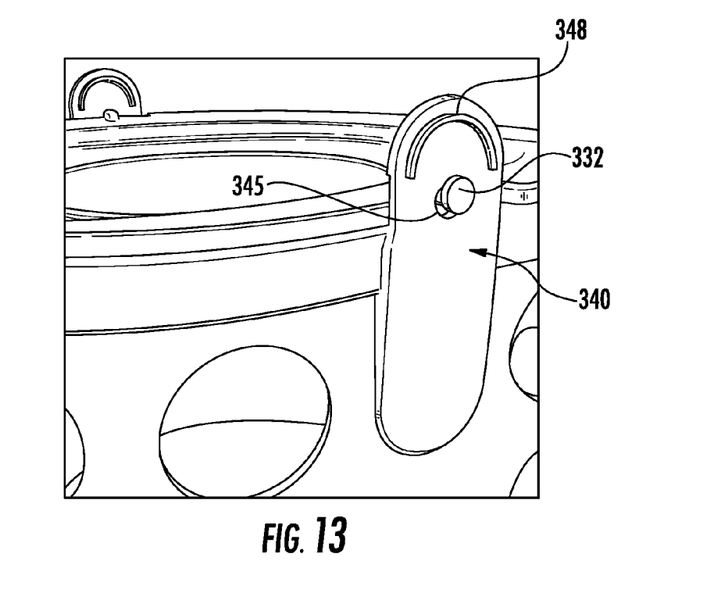
FIG. 13 is a detailed view of the latch of FIG. 11, in a locked position.

FIG. 11 is an exploded assembly view of another food container 300 that includes a sleeve 310, a glass container 320, lid 330, latches 340 and seal 350. In this embodiment, the latches 340 are shaped as button tabs, having an opening or aperture 345 configured to engage a protrusion 332 on the lid 330. FIGS. 12 and 13 show detailed views of the latch area of food container 300, where FIG. 12 shows the latch 340 in an open position, and FIG. 13 shows the latch 340 in an engaged or locked position.

In FIG. 12 the receiving features of the lid 330 include a recess 331 and the protrusion 332, where the protrusion 332 is located in recess 331 in this embodiment. The recess 331 of FIG. 12 is sized to accommodate the width of the latch 340. In other embodiments, the receiving feature of the lid 330 may be configured with the protrusion 332 on the perimeter of the lid 330, but without the recess 331. The latches 340 in FIG. 12 fold at a hinge point below the aperture 345, such that the latches 340 involve a pivoting motion to move between the open and locked positions, as described in other embodiments above. In some embodiments, sleeve 310 may be a stretchable first material having a first durometer, and the lid 330 may be a second material having a second durometer, where the second durometer is higher than the first durometer. In such embodiments the latches may be then stretched, in addition to or instead of pivoting the latch 340, to engage the receiving features of the lid 330. Stretching of the latch 340 to engage the lid 330 may provide additional securement of the lid 330 due to the tension from latch 340. FIGS. 12-13 also show a raised section 348, configured as an arc in this embodiment, to provide a gripping surface for the user to pull the latch 340 upward and onto the protrusion 332.

To lock the latches 340 onto the lid 330, the protrusion 332 is inserted through the aperture 345. FIG. 13 shows the latch 340 in its locked, upright position, with the protrusion 332 extending through the hole or aperture 345. The aperture 345 and protrusion 332 are configured with circular profiles in this embodiment, although other shapes are possible. In this embodiment, protrusion 332 includes an end portion 333 that is larger than a neck portion 334 (FIG. 12), the end portion 333 having a larger diameter than neck portion 334. The end portion 333 provides a lip to assist in securing latch 340 on protrusion 332. In other embodiments, the protrusion 332 may be configured with different retaining features such as a hook or a twist-lock fastener. In further embodiments, the aperture 345 may be sized to be smaller than the perimeter of the protrusion 332, such that the interference fit between the aperture 345 and protrusion 332, or the friction of a stretchable latch 340 with the protrusion 332, assists in securing the latch 340.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A food container comprising:
    a glass container having a bottom surface, side walls and a top opening;
    a lid capable of covering the top opening of the glass container, wherein the lid has a perimeter that is absent of features directly securing the lid to the container, and wherein the lid has a receiving feature near or on the perimeter, the receiving feature comprising a protrusion; and
    a protective sleeve capable of covering at least a portion of the side walls and at least a portion of the bottom surface of the glass container, and wherein the protective sleeve comprises a latch;
    wherein the latch is configured to move from an open position to a locked position, wherein the latch is uncoupled from the receiving feature in the open position, and wherein the latch stretches to engage only the receiving feature of the lid in the locked position.

2. The food container of claim 1 wherein the protective sleeve comprises a first material having a first durometer, wherein the lid comprises a second material having a second durometer, and wherein the second durometer is higher than the first durometer.

3. The food container of claim 2 wherein the latch comprises the first material and is integral with the protective sleeve.

4. The food container of claim 2 wherein the first material comprises silicone, and wherein the second material comprises polypropylene.

5. The food container of claim 1 wherein the receiving feature comprises a recess, the protrusion being located in the recess.

6. The food container of claim 1 wherein the latch comprises an aperture configured to engage the protrusion, and wherein the latch engages only the receiving feature of the lid in the locked position.

7. The food container of claim 6 wherein the aperture engages the protrusion by the protrusion being inserted through the aperture.

8. The food container of claim 1 wherein the latch is a tab extending from the protective sleeve.

9. The food container of claim 1 wherein the protective sleeve comprises a plurality of openings, wherein the openings enable visual access through the glass container.

10. The food container of claim 1 wherein the protective sleeve fits snugly around the glass container such that an intentional force must be applied to separate the protective sleeve from the glass container.

11. The food container of claim 1 wherein the protective sleeve is capable of covering and remaining on the glass container during stages of using the food container, wherein the stages comprise at least one of storage, cooking, freezing, dishwashing or other washing.

* * * * *